(12) United States Patent
Han

(10) Patent No.: US 10,834,080 B2
(45) Date of Patent: Nov. 10, 2020

(54) METHOD, DEVICE AND STORAGE MEDIUM FOR FORWARDING MESSAGES

(71) Applicant: Tencent Technology (Shenzhen) Company Limited, Shenzhen (CN)

(72) Inventor: Wuyu Han, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/373,302

(22) Filed: Apr. 2, 2019

(65) Prior Publication Data

US 2019/0230078 A1 Jul. 25, 2019

Related U.S. Application Data

(63) Continuation of application No. PCT/CN2018/087492, filed on May 18, 2018.

(30) Foreign Application Priority Data

Jun. 20, 2017 (CN) .......................... 2017 1 0472364

(51) Int. Cl.
*H04L 29/06* (2006.01)
*H04L 9/32* (2006.01)
(Continued)

(52) U.S. Cl.
CPC .......... *H04L 63/0876* (2013.01); *G06F 9/542* (2013.01); *G06F 21/554* (2013.01);
(Continued)

(58) Field of Classification Search
CPC ....... H04L 63/0876; H04L 29/06; H04L 9/32; H04L 51/046; H04L 63/126; H04L 51/32;
(Continued)

(56) References Cited

U.S. PATENT DOCUMENTS 9,348,981 B1 * 5/2016 Hearn ................... H04L 9/3271
9,756,007 B1 * 9/2017 Stringhini ............... H04L 51/30
(Continued)

FOREIGN PATENT DOCUMENTS

CN 104468249 A 3/2015
CN 104660481 A 5/2015

OTHER PUBLICATIONS

Tencent Technology, ISR, PCT/CN2018/087492, Jul. 31, 2018, 2 pgs.

(Continued)

*Primary Examiner* — Darren B Schwartz
(74) *Attorney, Agent, or Firm* — Morgan, Lewis & Bockius LLP

(57) ABSTRACT

Embodiments of this application disclose a message forwarding method and apparatus, and a storage medium. The method includes: receiving a target message sent by a terminal of a first account to a terminal of a second account; suspending forwarding a message of the terminal of the first account to the terminal of the second account when the first account or the target message has a risk; obtaining identity authentication question information and first answer information corresponding to the identity authentication question information; sending the identity authentication question information to the terminal of the first account; and receiving second answer information that is returned by the terminal of the first account and that corresponds to the identity authentication question information; and resuming forwarding the message of the terminal of the first account to the terminal of the second account when the first answer information and the second answer information match.

17 Claims, 7 Drawing Sheets

(51) Int. Cl.
  *H04L 12/58* (2006.01)
  *G06F 21/55* (2013.01)
  *G06F 9/54* (2006.01)
  *G06F 21/60* (2013.01)

(52) U.S. Cl.
  CPC ............... *H04L 9/32* (2013.01); *H04L 29/06* (2013.01); *H04L 51/046* (2013.01); *H04L 63/126* (2013.01); *H04L 51/20* (2013.01); *H04L 51/32* (2013.01)

(58) Field of Classification Search
  CPC ......... H04L 51/20; H04L 63/08; H04L 51/30; H04L 63/0869; H04L 9/3218; G06F 21/554; G06F 9/542; G06F 21/606
  See application file for complete search history.

(56) References Cited

U.S. PATENT DOCUMENTS

| | | | | |
|---|---|---|---|---|
| 10,616,196 | B1* | 4/2020 | Khitrenovich | G06N 20/00 |
| 2006/0212703 | A1* | 9/2006 | Kojima | H04L 63/12 |
| | | | | 713/175 |
| 2008/0034216 | A1* | 2/2008 | Law | H04L 9/3273 |
| | | | | 713/183 |
| 2008/0196099 | A1* | 8/2008 | Shastri | H04L 69/163 |
| | | | | 726/12 |
| 2009/0178120 | A1 | 7/2009 | Royyura et al. | |
| 2009/0222910 | A1* | 9/2009 | Le Bihan | G06F 21/57 |
| | | | | 726/19 |
| 2009/0265773 | A1* | 10/2009 | Schultz | H04L 63/102 |
| | | | | 726/7 |
| 2013/0074194 | A1* | 3/2013 | White | H04L 51/00 |
| | | | | 726/28 |
| 2013/0160100 | A1* | 6/2013 | Langley | G06Q 20/322 |
| | | | | 726/7 |
| 2014/0007214 | A1* | 1/2014 | Qureshi | H04W 4/029 |
| | | | | 726/12 |
| 2014/0172497 | A1* | 6/2014 | Kim | G06Q 10/0635 |
| | | | | 705/7.28 |
| 2014/0344161 | A1* | 11/2014 | Sato | G06Q 20/065 |
| | | | | 705/67 |
| 2015/0149777 | A1* | 5/2015 | Kim | H04L 63/0853 |
| | | | | 713/169 |
| 2015/0339477 | A1* | 11/2015 | Abrams | G06F 21/316 |
| | | | | 726/23 |
| 2016/0072792 | A1* | 3/2016 | Hu | H04L 63/08 |
| | | | | 726/7 |
| 2016/0156463 | A1* | 6/2016 | Suzuki | H04L 9/0819 |
| | | | | 713/171 |
| 2016/0191498 | A1* | 6/2016 | Marien | H04L 9/3271 |
| | | | | 726/7 |
| 2016/0197904 | A1* | 7/2016 | Taratine | H04L 63/102 |
| | | | | 726/4 |
| 2017/0006009 | A1* | 1/2017 | Hessler | G06Q 20/40 |
| 2017/0230323 | A1* | 8/2017 | Jakobsson | H04L 63/08 |
| 2017/0243136 | A1* | 8/2017 | Ho Kang | G06N 20/00 |
| 2017/0250968 | A1* | 8/2017 | Licht | H04L 9/3271 |
| 2017/0331818 | A1* | 11/2017 | Kader | H04L 67/42 |

OTHER PUBLICATIONS

Tencent Technology, WO, PCT/CN2018/087492, Jul. 31, 2018, 4 pgs.
Tencent Technology, IPRP, PCT/CN2018/087492, Dec. 24, 2019, 5 pgs.

* cited by examiner

METHOD, DEVICE AND STORAGE MEDIUM FOR FORWARDING MESSAGES

CROSS-REFERENCE TO RELATED APPLICATIONS

This application is a continuation application of PCT/CN2018/087492, entitled "METHOD AND DEVICE FOR FORWARDING MESSAGE, AND STORAGE MEDIUM" filed on May 18, 2018, which claims priority to China Patent Application No. 201710472364.3, filed with the Chinese Patent Office on Jun. 20, 2017 and entitled "MESSAGE FORWARDING METHOD AND APPARATUS, AND STORAGE MEDIUM", both of which are incorporated herein by reference in their entirety.

FIELD OF THE TECHNOLOGY

This application relates to the field of computer technologies, and in particular, to a message forwarding method and apparatus, and a storage medium.

BACKGROUND OF THE DISCLOSURE

With the popularization of Internet applications and increasing dependence of user's daily life for the Internet, the Internet security problem is increasingly prominent. Malicious programs and various phishing and frauds maintain increase at a high speed, and hacker attacks and large-scale personal information leakage events frequently occur. Accompanied with huge growth of various network attacks, leakage of a large quantity of personal information of online users continuously increases. Accompanied with leakage of personal information of citizens, the internet fraud has become one of many hazards and brings an enormous hidden security danger and damage to economic properties of people. For example, a network relationship chain fraud means that a criminal uses a network social tool to pretend to be a member in a social relationship chain of a victim to chat with the victim and implement a fraud. Because chatting is based on the Internet, provided that the criminal is similar to the counterfeited person (in aspects such as a head portrait, a name, a social relationship with the victim, and recent social activities), the fraud may easily succeed, and similarities are in direct proportion to fraud success rates, that is, a higher similarity indicates easier success in the fraud.

SUMMARY

According to a first aspect of this application, an embodiment of this application provides a message forwarding method performed at a computing device having one or more processors and memory storing a plurality of programs to be executed by the one or more processors, the method comprising:

receiving a target message sent by a terminal of a first account to a terminal of a second account;

suspending forwarding a message of the terminal of the first account to the terminal of the second account when the first account or the target message has a risk;

obtaining identity authentication question information and first answer information corresponding to the identity authentication question information;

sending the identity authentication question information to the terminal of the first account;

receiving second answer information that is returned by the terminal of the first account and that corresponds to the identity authentication question information; and resuming forwarding the message of the terminal of the first account to the terminal of the second account when the first answer information and the second answer information match.

According to a second aspect of this application, an embodiment of this application provides a computing device for forwarding messages comprising a processor and memory connected to the processor, the memory storing a plurality of machine readable instructions that, when executed by the processor, cause the computing device to perform the aforementioned message forwarding method.

According to a third aspect of this application, an embodiment of this application provides a non-transitory computer readable storage medium storing a plurality of instructions for forwarding messages in connection with a computing device having a processor, wherein the plurality of instructions, when executed by the processor, cause the computing device to perform the aforementioned message forwarding method.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

The following clearly and completely describes the technical solutions in the embodiments of the present application with reference to the accompanying drawings in the embodiments of the present application. Apparently, the described embodiments are some embodiments of the present application rather than all of the embodiments. All other embodiments obtained by a person skilled in the art based on the embodiments of the present application without creative efforts shall fall within the protection scope of the present application.

Usually, to ensure security of personal properties of citizens on a social platform and take the social responsibility that the platform should bear, social platforms and instant messaging software may remind a user of staying sharp and verifying the identity of the other party by using means such as delivering security prompts in a chat. For example, in an application scenario shown in FIG. 1A, when chat content between users is related to preset security information, prompt information shown in 101 of FIG. 1A may be presented, to prompt a user that there may be a risk in current chat content. However, in many cases, the user may not view or omit the prompt information, and consequently, general reachability of the prompt information is not high, and a corresponding alert effect cannot be achieved. In other words, a corresponding prompt effect is not achieved, and an effective rate for prompt when there is a risk is insufficient.

To resolve the foregoing technical problem of an insufficient effective rate for prompting a user when there is a risk in a process in which the user chats with other users through an instant messaging application or a social network platform, in an embodiment of this application, a message forwarding method is provided. Implementation of the method may rely on a computer program. The computer program may be run a Von Neumann-based computer system. The computer program may be an application of message forwarding based on an instant messaging application or a social network platform. The computer system may be a computer device, such as a smartphone, a tablet computer, and a personal computer, that runs the foregoing computer program. It should be noted that in this embodiment, the foregoing message forwarding method is performed by a server, for example, a web server corresponding to an instant messaging application or a social network platform, based on an instant messaging application or a social network platform, for forwarding a message between users. For example, when a user sends a message to other users or a user group through an instant messaging application or a social network platform, the user sends to a server a message that needs to be sent, and the server forwards the message to a user or a user group that needs to send a message.

Figure 1A:
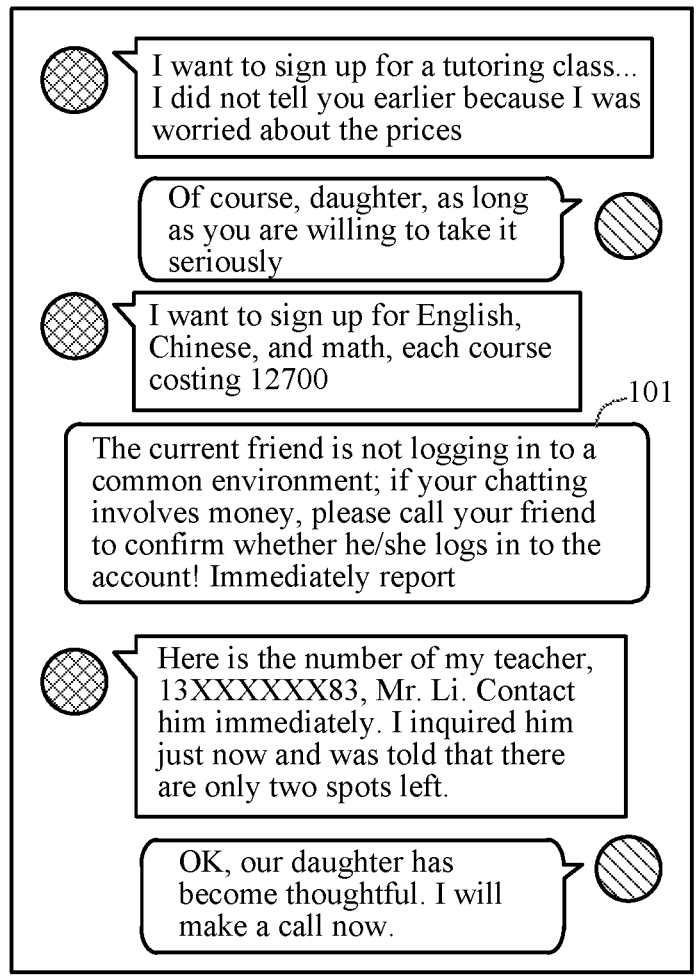
FIG. 1A is a schematic diagram of a risk prompt interface based on a chat interface according to an embodiment of this application.
Figure 1B:
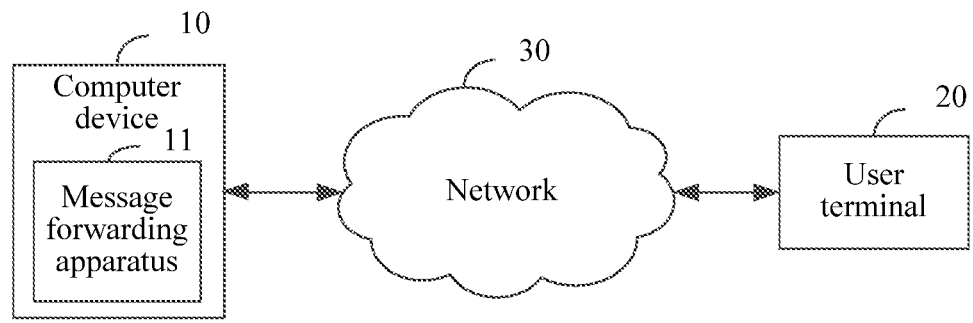
FIG. 1B is a schematic diagram of an implementation environment of a message forwarding method according to an embodiment of this application.

FIG. 1B is a schematic diagram of an implementation environment of a message forwarding method according to an embodiment of this application. A computer device 10 is integrated with a message forwarding apparatus 11 provided by any embodiment of this application, and the message forwarding apparatus 11 is configured to implement a message forwarding method provided by any embodiment of this application. The computer device 10 and a user terminal 20 are connected through a network 30, and the network 30 may be a wired network or a wireless network. In this embodiment of this application, the computer device 10 may be a server device.

Figure 2:
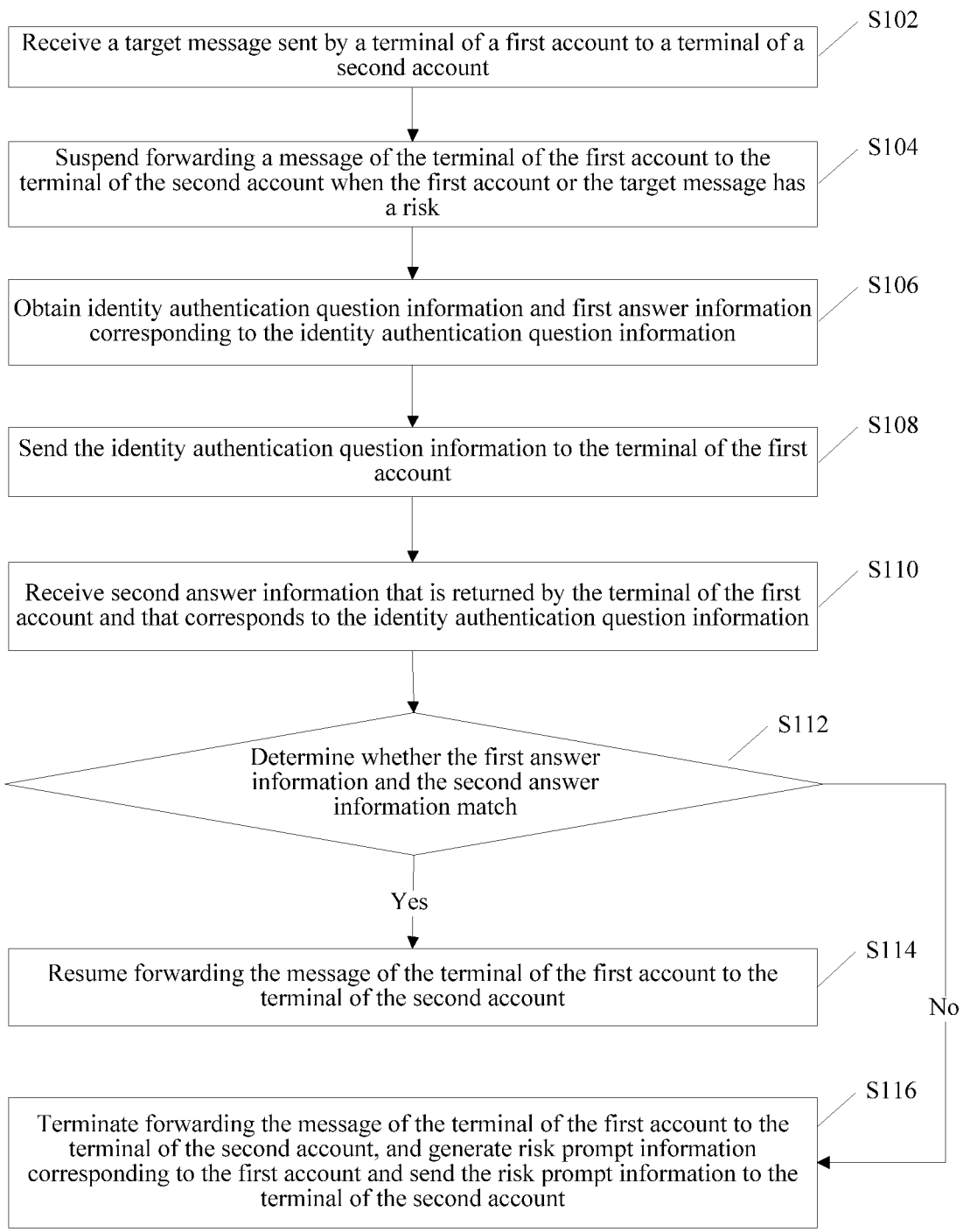
FIG. 2 is a schematic flowchart of a message forwarding method according to an embodiment of this application.

The message forwarding method provided in this embodiment of this application may be applied to the computer device, such as a server. The method includes the following steps S102 to S108, as shown in FIG. 2.

Step S102: Receive a target message sent by a terminal of a first account to a terminal of a second account.

After logging in to an instant messaging application or a social network platform, a user may send a message to other users or friends on a social relationship chain through the instant messaging application or the social network platform. In other words, after logging in to the first account on the terminal through a web page or a client (APP) of the instant messaging application or the social network platform, the user may send a message to other user terminals.

It should be noted that in this embodiment, the user may log in into the corresponding instant messaging application or social network platform on the user terminal through the web page or APP, and sends a message. In subsequent statement, an example in which the user downloads the APP corresponding to the instant messaging application or social network platform from the user terminal is used, that is, the user sends a message through the APP that is installed on the user terminal and that corresponds to the instant messaging application or social network platform.

In this embodiment, after receiving a message sending request sent by the terminal that has logged in to the first account, the server obtains a target user (that is, the terminal of the second account) that needs to send a message and that is included in the message sending request and obtains the message (that is, the target message) that needs to be sent, and then performs operations related to message forwarding according to the obtained second account and target message.

It should be noted that in this embodiment, the second account may be a personal account or a user account (that is, an account of a user group). That is, the target message sent by the terminal of the first account may be sent to a user terminal or may be sent to user terminals corresponding to all accounts included in a user group. That is, there may be more than one terminal of the second account.

Step S104: Suspend forwarding a message of the terminal of the first account to the terminal of the second account when the first account or the target message has a risk.

As shown in FIG. 1A, when a chat between users involves money or other sensitive information, the server corresponding to the instant messaging application or the social network platform automatically delivers a corresponding security prompt to the users, to prompt the user to authenticate the real identity of the other user.

In this embodiment, when the target message is sent by the terminal of the first account to the terminal of the second account, the target message is forwarded by the server. After receiving the target message sent by the terminal of the first account, the server identifies the target message and determines whether the target message includes content that has a risk.

Specifically, in an embodiment of this application, a process of determining whether target information has a risk may be performed by searching the target message for a keyword matching a preset risk keyword. In other words, text information included in the target message is searched, to determine whether a keyword matching the preset risk keyword exists. If a keyword matching the preset risk keyword exists, it is determined that the target message has a risk, and otherwise, it is determined that the target message has no risk.

In another embodiment, the text information included in the target message is segmented, and at least one word obtained after segmentation is obtained, and then the at least one word is searched to determine whether a word matching the preset risk keyword exists. If the word is obtained through searching, it indicates that the target message has a risk, and otherwise, it indicates that the target message has no risk. For example, the preset risk keyword may include keywords related to account security of a user such as remittance, accounts, and money. For another example, when the target message is "could you transfer money 10000 RMB into my account?", the target message is considered to have a risk due to keywords "account" and "money".

Cases of a security risk between the terminal of the first account and the terminal of the second account not only includes a case in which the target message has a risk but also includes a case in which the terminal of the first account or the terminal of the second account has a risk, for example, an running environment has a risk or a location is abnormal.

Specifically, in an embodiment, after the receiving a target message sent by a terminal of a first account to a terminal of a second account, the method further includes: obtaining location information of the terminal of the first account, and determining, when the location information does not match historical location information corresponding to the first account, that the first account has a risk.

Each time the user logs in to the first account on the user terminal, the user obtains current location information of the user. For example, a city or an area in which the user is located is obtained by using an IP address of the user terminal or a network address. Alternatively, the current location information of the user terminal is obtained by using a positioning system on the user terminal and is uploaded to the server. That is, whether location information corresponding to a current location at which the first account is located matches historical data is determined according to the location information included in historical data of login of the first account. In other words, whether the current location at which the terminal of the first account is located is a location that already exists in the historical data.

Specifically, the location information of the terminal of the first account is obtained in a process of logging in on the user terminal, or the location information of the terminal of the first account is obtained before the terminal of the first account sends the target message, and the location information is sent to the server when the target message is sent to the server.

If the location information of the terminal of the first account does not match historical location information corresponding to the first account, it indicates that the first account may be stolen by another user, and therefore there is a risk, that is, the first account has a risk. Otherwise, if the location information of the terminal of the first account matches historical location information corresponding to the first account, it is determined that the first account has no risk.

In this embodiment, if the first account has a risk or the target message has a risk, in this case, if the target message continues to be forwarded, a hidden security danger may be caused. Specifically, if the first account has a risk or the target message has a risk, sending of the message between the terminal of the first account and the terminal of the second account need to be stopped. In other words, in this case, sending of the message between the terminal of the first account and the terminal of the second account needs to be blocked until it is confirmed that there is no risk currently or a risk is removed.

It should be noted that in this embodiment, provided that there is a security risk that may affect information security, account security, and the like of the user, sending of the message between the terminal of the first account and the terminal of the second account needs to be suspended. In addition, for all cases in which it is determined that there is a risk, provided that one case is met, it is considered that there is a risk. For example, when the first account has a risk, the target message has a risk, or the first account and the target message both have a risk, forwarding of the message of the terminal of the first account to the terminal of the second account is suspended.

Step S106: Obtain identity authentication question information and first answer information corresponding to the identity authentication question information.

Step S108: Send the identity authentication question information to the terminal of the first account.

Step S110: Receive second answer information that is returned by the terminal of the first account and that corresponds to the identity authentication question information.

It should be noted that in this embodiment, when sending of the message between the terminal of the first account and the terminal of the second account has a risk, a user identity corresponding to the first account needs to be authenticated. Different from a solution in the past in which identity authentication is performed based on a question-answer database (that is, a privacy question and an answer for reference are preset), in this embodiment, a user corresponding to the first account and a user corresponding to the second account need to provide answers to the same question, that is, do not rely on the question-answer database, and a database in which answers corresponding to answers for reference one to one does not need to be pre-established. For example, the user corresponding to the first account and the user corresponding to the second account both need to provide answers to an identity authentication question "what is Zhang XX's telephone number?" and return the answers to the server, and the server authenticates the answers.

Specifically, in an embodiment of this application, the server may randomly select an identity authentication question from a preset question database as a question in this embodiment used by the user to assess the risk. For example, at least one question commonly used for identity authentication is set in the question database. In this step, the server selects one from the at least one question as the identity authentication question of this method.

In another embodiment of this application, the identity authentication question may also be set by the user corresponding to the second account. For example, the server sends a list corresponding to at least one optional question to the terminal of the second account, and the user corresponding to the second account selects the identity authentication question from the list through the terminal of the second account and returns the identity authentication question to the server. For another example, when the identity authentication question needs to be determined, a request corresponding to the setting of the identity authentication question is sent to the terminal corresponding to the second account, and the user corresponding to the second account enters the identity authentication question through the terminal corresponding to the second account and returns the entered identity authentication question to the server, so that the server can obtain the identity authentication question.

in this embodiment, answer information provided by a receiving party (that is, the terminal of the second account) of the target message for the identity authentication question is the first answer information, and an answer provided by a sending party (that is, the terminal of the first account) of the target message for the identity authentication question is the second answer information.

It should be noted that in this embodiment, obtaining time of the first answer information varies as setting time of the identity authentication question varies.

For example, when the identity authentication question is set by the server, after step S104, after determining the identity authentication question for risk confirmation, the server respectively sends the identity authentication question information to the terminal of the first account and the terminal of the second account, and then the corresponding user may provide answer information for the received identity authentication question.

Specifically, the obtaining identity authentication question information and first answer information corresponding to the identity authentication question information includes: obtaining the preset identity authentication question information, sending the identity authentication question information to the terminal of the second account, receiving answer information sent by the terminal of the second account, and using the answer information as the first answer information. In addition, in step S108 to step S110, the identity authentication question information is sent to the terminal of the first account, and second answer information that is returned by the terminal of the first account and that corresponds to the identity authentication question information is received.

That is, the identity authentication question is determined by the server, and then the server respectively sends the determined identity authentication question to the terminal of the first account and the terminal of the second account, and the second answer information returned by the terminal of the first account and the first answer information returned by the terminal of the first answer information are received.

In another embodiment, the identity authentication question may also be set by the terminal of the second account. Specifically, the obtaining identity authentication question information and first answer information corresponding to the identity authentication question information includes: sending an identity authentication question and an answer setting request to the terminal of the second account; and receiving the identity authentication question information that is sent by the terminal of the second account for the identity authentication question and the answer setting request, and the first answer information corresponding to the identity authentication question information.

That is, when the identity authentication question needs to be determined, the server sends a request corresponding to the identity authentication question to the terminal of the second account, that is, the identity authentication question and the answer setting request. After receiving the request, the terminal of the second account presents the preset identity authentication question and an interface related to answer setting on a display interface of the terminal, and then the user may enter the identity authentication question or select the identity authentication question through the interface.

It should be noted that in this embodiment, in a process of setting the identity authentication question, the terminal of the second account may freely set the identity authentication question (that is, enter text information corresponding to the identity authentication question) or may select the identity authentication question from more than one optional preset identity authentication questions provided by the server.

When the user sets the identity authentication question through the terminal of the second account, the user corresponding to the second account also needs to provide an answer, that is, the first answer information, to the set identity authentication question and sends the first answer information and the set identity authentication question together to the server.

After receiving the identity authentication question and the first answer information that are sent by the terminal of the second account, the server sends identity authentication information to the terminal of the first account, so that the terminal of the first account can present the identity authentication question, so that the user corresponding to the first account can enter answer information, that is, the second answer information, corresponding to the identity authentication question through an interface or a window that presents the identity authentication question, and returns the second answer information to the server after entering is completed.

It should be noted that in this embodiment, a time limit for the answer information may also be provided to the terminal of the first account for the identity authentication question. In other words, it is limited that the terminal of the first account needs to provide the answer information for the identity authentication question within a preset duration range.

Specifically, after the sending the identity authentication question information to the terminal of the first account, the method further includes: determining, when the terminal of the first account does not return the second answer information corresponding to the identity authentication question information within preset duration, that the first account has a risk.

In other words, after the identity authentication question is sent to the terminal of the first account, a timer corresponding to the preset duration is started, and after the time is woken, if the terminal of the first account does not provide the answer information for the identity authentication question, it is determined that the first account has a risk. In other words, it is avoided that the user corresponding to the first account may find the answer information corresponding to the identity authentication question through the network when the first account is stolen or has a fraud, thereby further improving reliability of identity authentication.

Step S112: Determine whether the first answer information and the second answer information match. If the first answer information and the second answer information match, perform step S114: Resume forwarding the message of the terminal of the first account to the terminal of the second account. If the first answer information and the second answer information do not match, perform step S116: Terminate forwarding the message of the terminal of the first account to the terminal of the second account, and generate risk prompt information corresponding to the first account and send the risk prompt information to the terminal of the second account.

In this embodiment, whether sending of the message between the terminal of the first account and the terminal of the second account has a risk is determined by providing respective answers for the same identity authentication question by the terminal of the first account and the terminal of the second account, and then determining whether the answers respectively provided by the terminal of the first account and the terminal of the second match each other. In other words, if the answer provided by the terminal of the first account is the same as the answer provided by the second account, it indicates that in a current situation, the user corresponding to the first account and the user corresponding to the second account know each other, and are not counterfeited by others.

In specific embodiments, matching is performed on the first answer information corresponding to the second account and the second answer information corresponding to the first account; if the first answer information corresponding to the second account and the second answer information corresponding to the first account match, it indicates that currently, sending of the message between the terminal of the first account and the terminal of the second account does not have a risk, and the message may continue to be normally sent. Otherwise, namely, if the first answer information and the second answer information do not match, it indicates that currently, sending of the message between the terminal of the first account and the terminal of the second account has a risk, that is, the first account may be stolen or counterfeited. Therefore, sending of the message between the two needs to be blocked.

Specifically, when the first answer information and the second answer information match, the forwarding of the message of the terminal of the first account to the terminal of the second account that is suspended in step S104 is resumed, that is, forwarding of the message of the terminal of the first account to the terminal of the second account is resumed. When the first answer information and the second answer information do not match, sending of the message between the terminal of the first account and the terminal of the second account is blocked, that is, forwarding of the message of the terminal of the first account to the terminal of the second account is terminated.

It should be noted that in this embodiment, when that the terminal of the first account sends the target message to the terminal of the second account has a risk, sending of the message needs to be blocked, and the terminal of the second account needs to be informed of a corresponding security risk. In other words, when the first answer information and the second answer information do not match, the risk prompt information corresponding to the first account is generated, and the risk prompt information is sent to the terminal of the second account.

Figure 3:
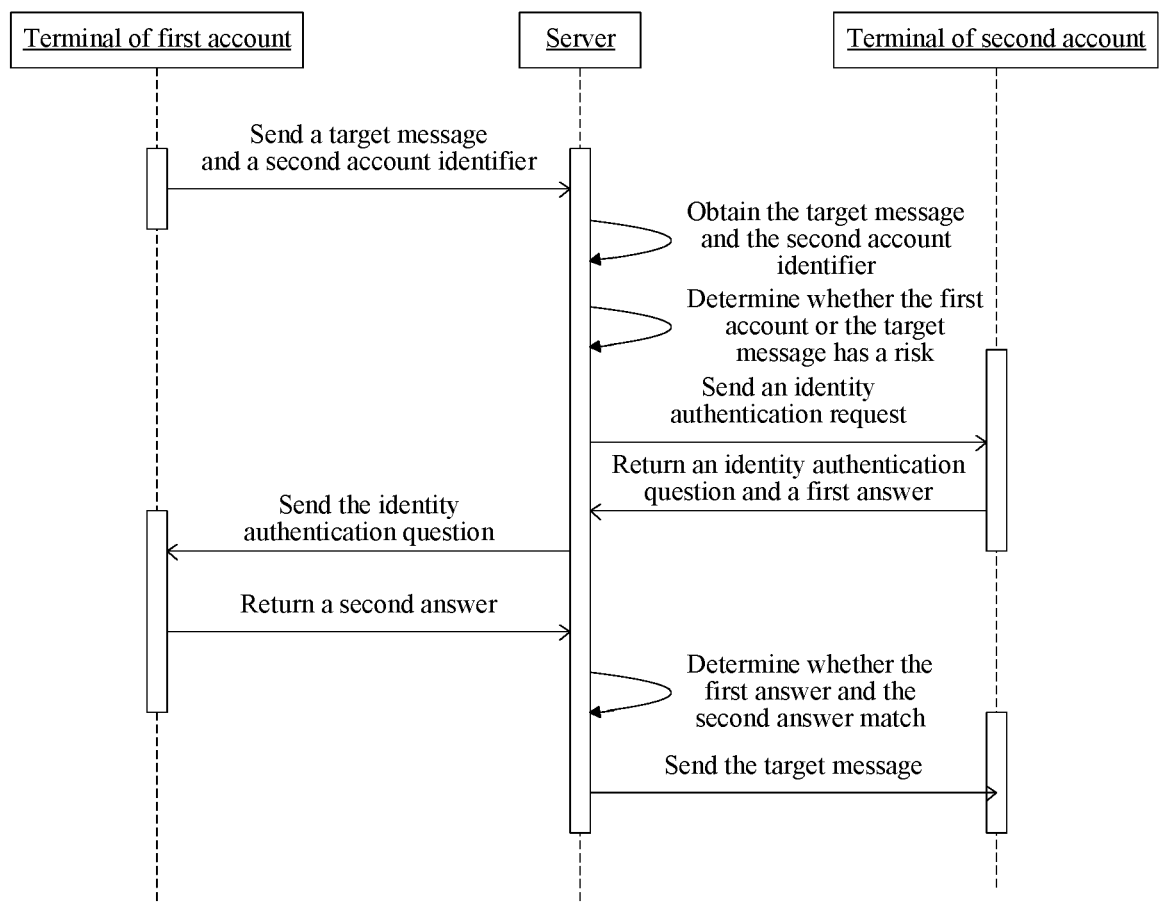
FIG. 3 is a schematic diagram of interaction between terminals in a message forwarding method according to an embodiment of this application.

As shown in FIG. 3, FIG. 3 shows an interaction relationship between the terminal of the first account, the terminal of the second account, and the server.

Description is provided by using an example in which the first account or the target message has a risk, and the subsequent identity authentication succeeds. The user sends the target message and an account identifier corresponding to a receiving party (the terminal of the second account) of the target message to the server through the terminal of the first account. After receiving the target message and the second account identifier, the server determines, by detecting the first account and the target message, whether the current first account or target message has a fraud, a counterfeit, or other risks. In addition, when there is a risk, the server requests the identity authentication question and the first answer information from the terminal of the second account, and the terminal of the second account returns the identity authentication question and the first answer information to the server in response to the request. Then the server sends the identity authentication question to the terminal of the first account and receives the second answer information returned by the terminal of the first account. Then the server compares the first answer information and the second answer information, to determine whether the first answer information and the second answer information match. When the first answer information and the second answer information match, the server sends the previously received target message sent by the terminal of the first account to the terminal of the second account to the terminal of the second account.

In another embodiment, the server forwarding the message between the terminal of the first account and the terminal of the second account is a web server corresponding to an instant messaging application or a social network platform, and the server performing identity authentication may be another server or may be an independent module for identity authentication in the web server.

Figure 4:
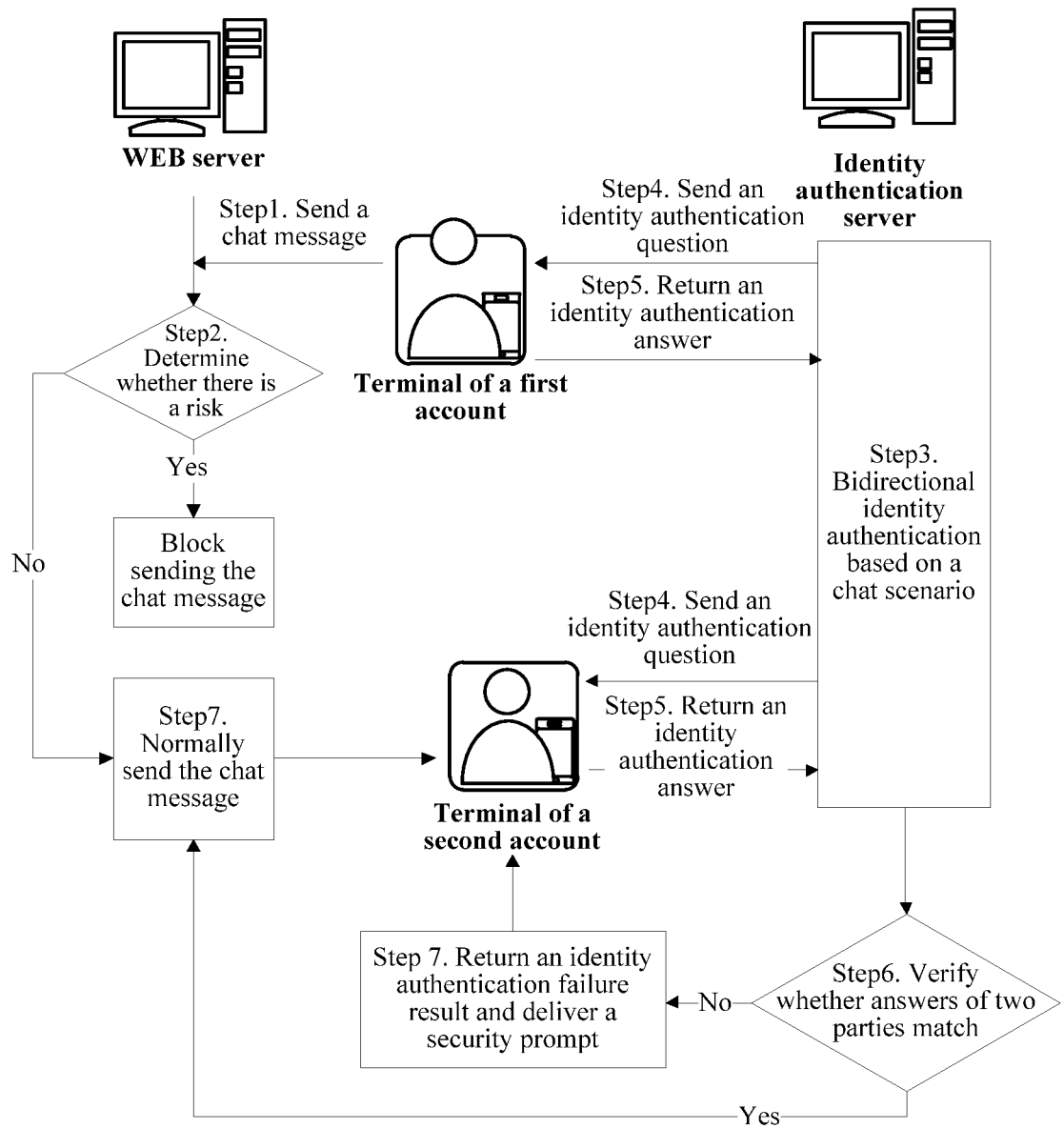
FIG. 4 is a schematic flowchart of a message forwarding method based on an identity authentication server according to an embodiment of this application.

FIG. 4 is a schematic flowchart of a message forwarding method based on an identity authentication server according to an embodiment of this application. An example in which an identity authentication server independent of the web server performs identity authentication is used in FIG. 4. The web server and the identity authentication server may communicate with each other. For example, when detecting that current message sending has a risk, the web server instructs the identity authentication server to determine the identity authentication question and obtain the answer information provided by the terminal of the first account and the terminal of the second account for the identity authentication question. Then the identity authentication server authenticates the answer information provided by the terminal of the first account and the terminal of the second account for the identity authentication question. After identity authentication succeeds, the web server is instructed to send the message for sending the terminal of the first account to the terminal of the second account to the terminal of the second account. When identity authentication does not succeed, sending of the message between the terminal of the first account and the terminal of the second account is blocked, and security prompt information is delivered to the terminal of the second account.

Figure 5:
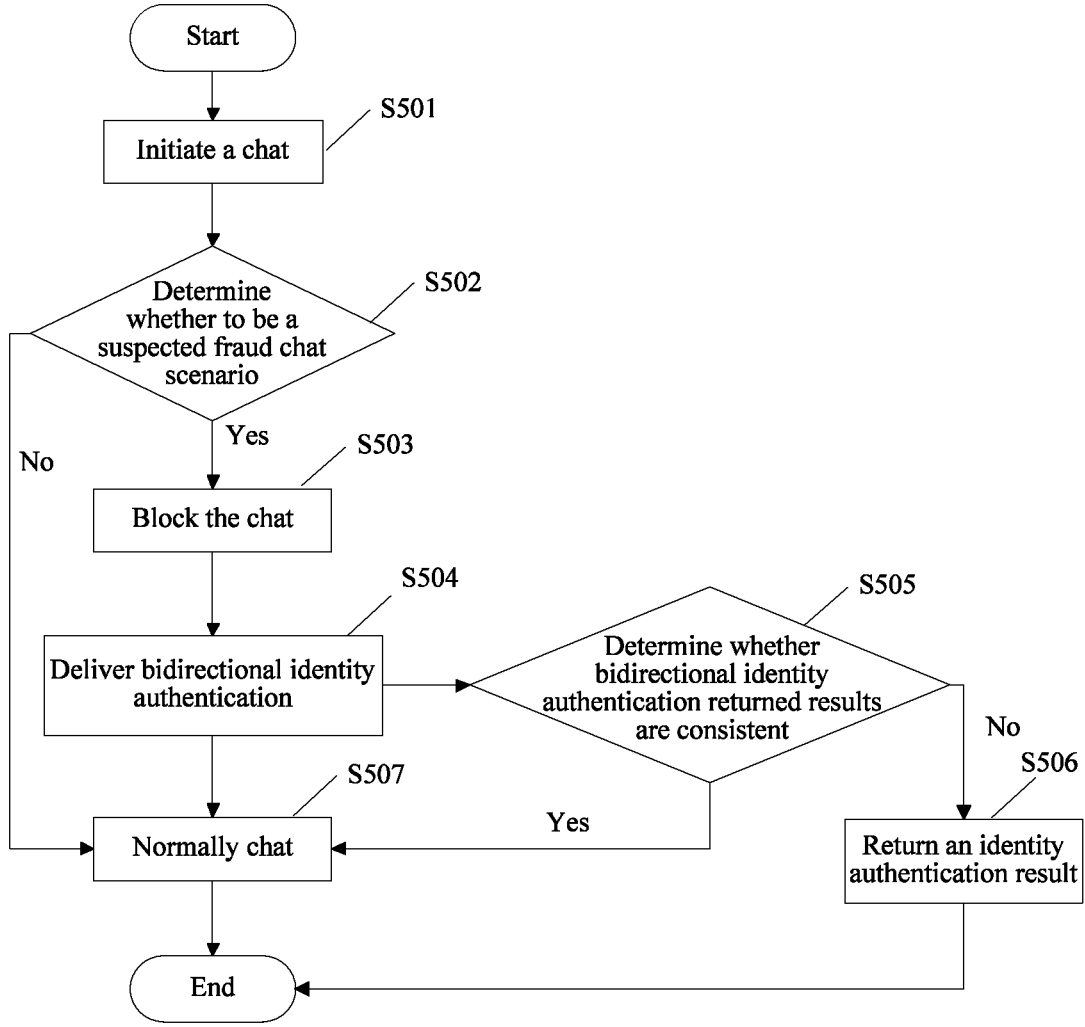
FIG. 5 is a schematic flowchart of a message forwarding method according to an embodiment of this application.

FIG. 5 is a schematic flowchart of a message forwarding method according to an embodiment of this application. As shown in FIG. 5, the method may include the following steps:

Step S501: Two parties of a chat initiate a chat.

Step S502: A server determines whether to be a suspected fraud chat scenario. If yes, perform step S503; if not, perform step S507.

Step S503: The server blocks the chat.

Step S504: The server delivers bidirectional identity authentication to the two parties of the chat. That is, the server sends the same identity authentication question to the two parties of the chat.

Step S505: The server determines whether results (that is, answers) returned by the two parties of the chat for the identity authentication question are consistent. If the results are consistent, perform step S507. If the results are inconsistent, perform step S506.

Step S506: Return an identity authentication result to a message receiving patty, and end the chat.

Step S507: The server normally forwards a chat message between the two parties of the chat.

Figure 6A:
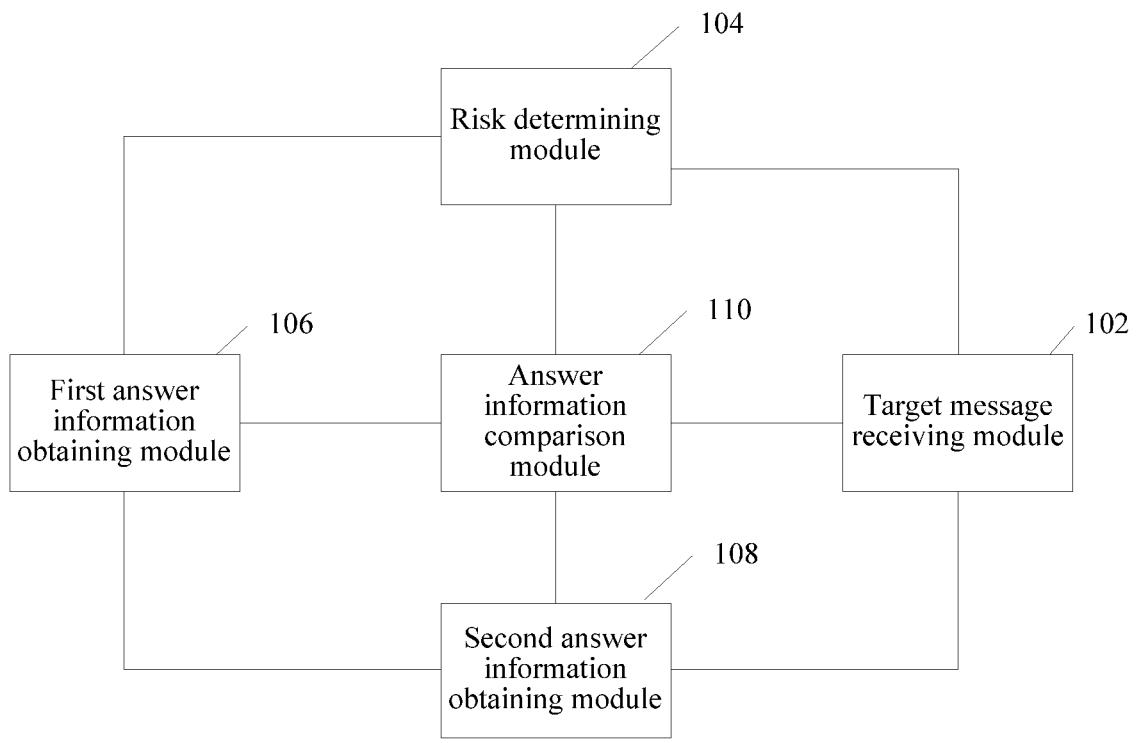
FIG. 6A is a schematic structural diagram of a message forwarding apparatus according to an embodiment of this application.

In addition, to resolve the technical problem in the conventional technology of an insufficient effective rate for prompting a user when there is a risk in a process in which a user chats with other users through an instant messaging application or a social network platform, in an embodiment of this application, as shown in FIG. 6A, a message forwarding apparatus is further provided. The message forwarding apparatus includes a target message receiving module 102, a risk determining module 104, a first answer information obtaining module 106, a second answer information obtaining module 108, an answer information comparison module 110.

The target message receiving module 102 is configured to receive a target message sent by a terminal of a first account to a terminal of a second account.

The risk determining module 104 is configured to suspend forwarding a message of the terminal of the first account to the terminal of the second account when the first account or the target message has a risk.

The first answer information obtaining module 106 is configured to obtain identity authentication question information and first answer information corresponding to the identity authentication question information.

The second answer information obtaining module 108 is configured to: send the identity authentication question information to the terminal of the first account; and receive second answer information that is returned by the terminal of the first account and that corresponds to the identity authentication question information.

The answer information comparison module 110 is configured to resume forwarding the message of the terminal of the first account to the terminal of the second account when the first answer information and the second answer information match.

In an embodiment, the first answer information obtaining module 106 is further configured to obtain the preset identity authentication question information, send the identity authentication question information to the terminal of the second account, receive answer information sent by the terminal of the second account, and use the answer information as the first answer information.

In an embodiment, the first answer information obtaining module 106 is further configured to send an identity authentication question and an answer setting request to the terminal of the second account; and receive the identity authentication question information that is sent by the terminal of the second account for the identity authentication question and the answer setting request, and the first answer information corresponding to the identity authentication question information.

In an embodiment, the risk determining module 104 is further configured to obtain location information of the terminal of the first account, and determine, when the location information does not match historical location information corresponding to the first account, that the first account has a risk.

In an embodiment, the risk determining module 104 is further configured to search the target message for a keyword matching a preset risk keyword, and determine, when the keyword is found, that the target message has a risk.

In an embodiment, the risk determining module 104 is further configured to determine, when the terminal of the first account does not return the second answer information corresponding to the identity authentication question information within preset duration, that the first account has a risk.

Figure 6B:
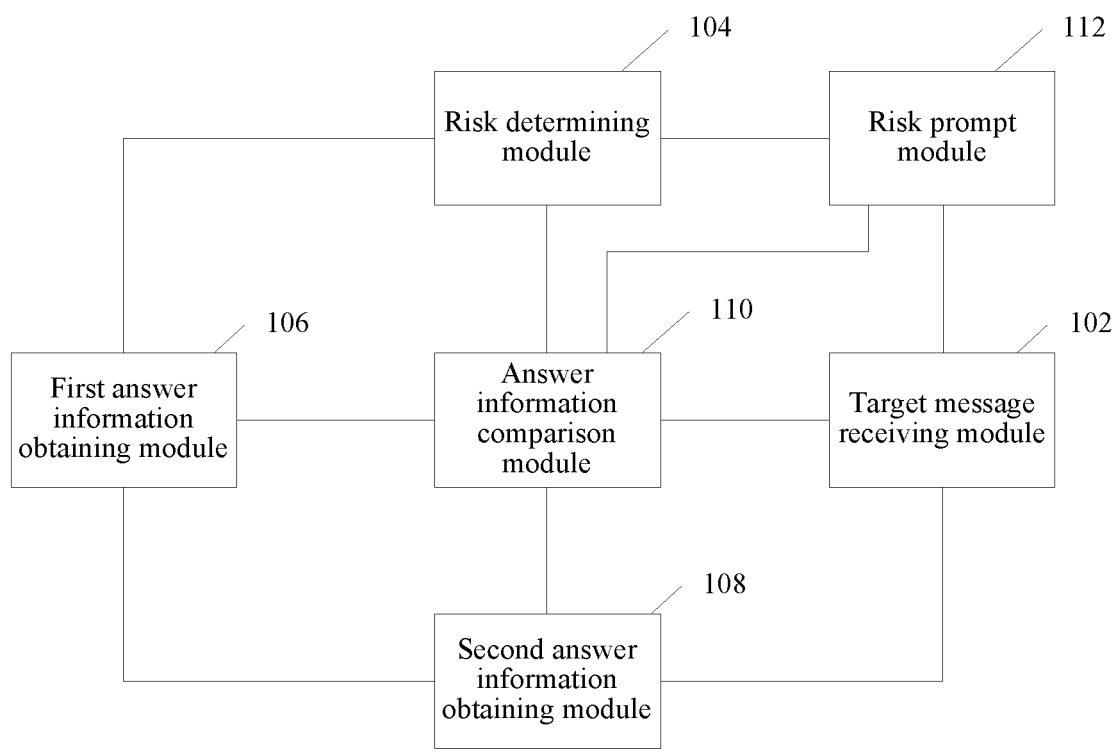
FIG. 6B is a schematic structural diagram of a message forwarding apparatus according to an embodiment of this application.

In an embodiment, as shown in FIG. 6B, the apparatus further includes a risk prompt module 112, configured to terminate forwarding the message of the terminal of the first account to the terminal of the second account when the first answer information and the second answer information do not match; and generate risk prompt information corresponding to the first account and send the risk prompt information to the terminal of the second account.

After the message forwarding method and apparatus provided in the embodiments of this application are used, when the terminal of the first account sends a message to the terminal of the second account through the server, if it is detected that the first account or the sent message has a risk, the server suspends forwarding the message sent by the terminal of the first account to the second account, requests answer information for the same identity authentication question from the terminal of the first account and the terminal of the second account through the server, compares answer information respectively provided by the terminal of the first account and the terminal of the second account, when the answer information matches each other, determines that there is no risk and resumes forwarding the message sent by the terminal of the first account to the second account, and when the answer information does not match each other, determines that there is a risk, blocks sending the message between the terminal of the first account and the terminal of the second account, and sends a security prompt message to the terminal of the second account. In other words, after the message forwarding method and apparatus are used, when there is a risk for sending of the message between the users, identity authentication is performed on both parties of a chat in real time, thereby improving reliability of identity authentication and security of message forwarding and ensuring validity of security prompt for the user when there is a security risk. In addition, in a chatting process, bidirectional identity authentication on two parties of the chat also improves a processing capability of a computing device.

All or some of the foregoing embodiments may be implemented through software, hardware, firmware, or any combination thereof. When the embodiments are implemented by using a software program, all or some of the embodiments may be implemented in a form of a computer program product. The computer program product includes one or more computer instructions. When the computer program instructions are loaded and executed on a computer, all or some of the processes or functions according to the embodiments of this application are produced. The computer may be a general-purpose computer, a special-purpose computer, a computer network, or another programmable apparatus. The computer instructions may be stored in a non-volatile computer readable storage medium or may be transmitted from a computer readable storage medium to another computer readable storage medium. For example, the computer instructions may be transmitted from a website, a computer, a server, or a data center to another website, computer, server, or data center in a wired (such as a coaxial cable, a fiber, or a digital subscriber line (DSL)) or wireless (such as infrared, radio, or microwave) manner. The computer readable storage medium may be any available medium capable of being accessed by a computer or include one or more data storage devices integrated by an available medium, such as a server and a data center. The available medium may be a magnetic medium (such as a floppy disk, a hard disk, or a magnetic tape), an optical medium (such as a DVD), a semiconductor medium (such as a solid state disk (SSD)) or the like.

Figure 7:
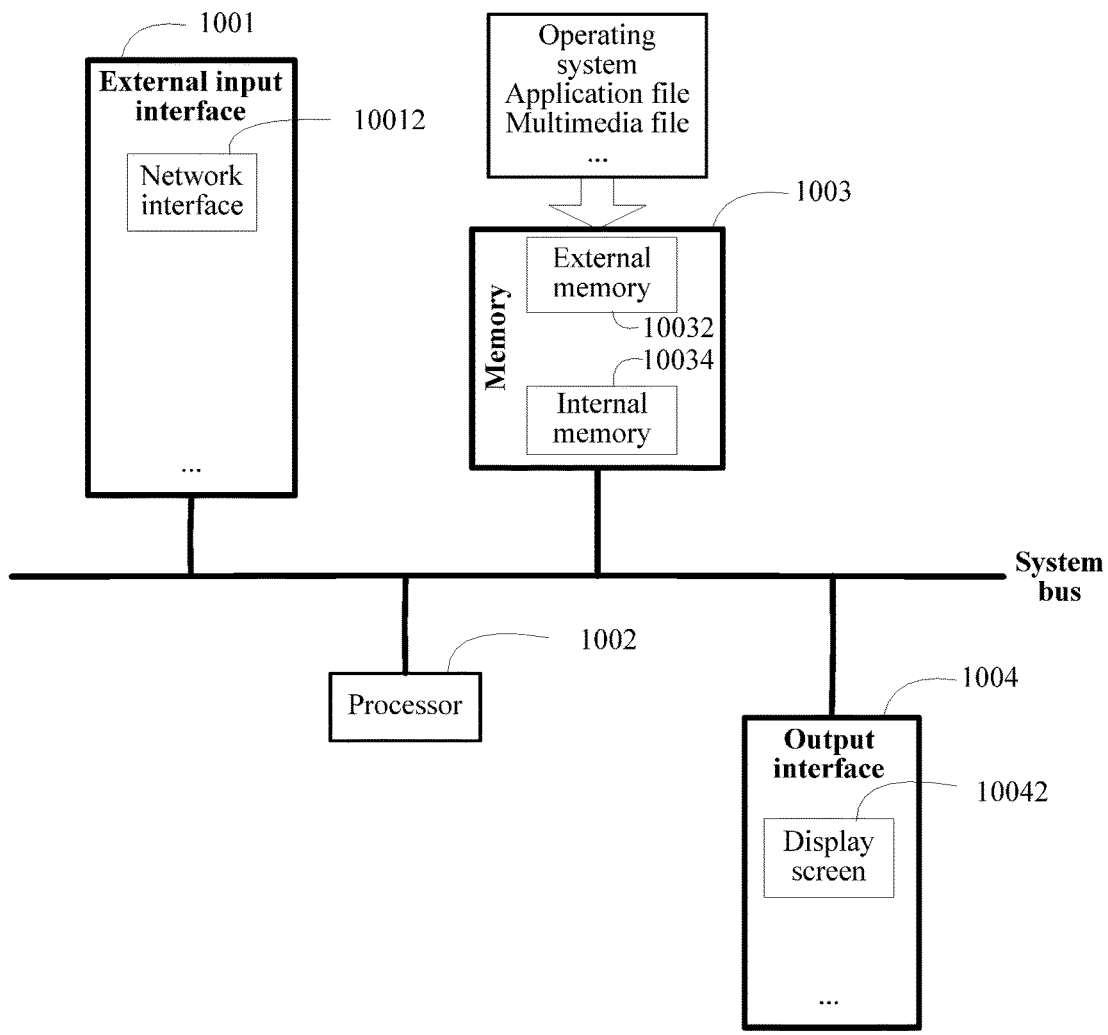
FIG. 7 is a schematic structural diagram of a computer device running the message forwarding method according to an embodiment of this application.

In an embodiment, as shown in FIG. 7. FIG. 7 shows a Von Neumann-based computer device running the foregoing message forwarding method. The computer device may be a terminal device, such as a smartphone, a tablet computer, a palmtop computer, a notebook computer, or a personal computer, or a server device. Specifically, the computer device may include an external input interface 1001, a processor 1002, a memory 1003, and an output interface 1004 that are connected through a system bus. The external input interface 1001 may include at least a network interface 10012. The memory 1003 may include an external memory 10032 (such as a hard disk, an optical disc, or a floppy disk) and an internal memory 10034. The output interface 1004 may include at least a device such as a display screen 10042.

In this embodiment, running of the method is based on a computer program. A program file (a machine readable instruction) of the computer program is stored in an external memory 10032 of the foregoing Von Neumann-based computer device, is loaded into an internal memory 10034 when being run, and then is compiled into machine code and transferred to the processor 1002 for execution, so that a logical target message receiving module 102, a risk determining module 104, a first answer information obtaining module 106, a second answer information obtaining module 108, an answer information comparison module 110, and a risk prompt module 112 are formed in a Von Neumann-based computer device. In addition, in the process of performing the foregoing message forwarding method, input parameters are all received through the external input interface 1001, are transferred to the memory 1003 for caching, and then are input into the processor 1002 for processing. Processed result data is cached in the memory 1003 for subsequent processing or is transferred to the output interface 1004 for output.

Specifically, the network interface 10012 is configured to: under control of the processor 1002, receive a target message sent by a terminal of a first account to a terminal of a second account.

The processor 1002 is configured to: suspend forwarding a message of the terminal of the first account to the terminal of the second account when the first account or the target message has a risk; and obtain identity authentication question information and first answer information corresponding to the identity authentication question information.

The network interface 10012 is further configured to: under control of the processor 1002, send the identity authentication question information to the terminal of the first account; and receive second answer information that is returned by the terminal of the first account and that corresponds to the identity authentication question information.

The processor 1002 is further configured to: resume forwarding the message of the terminal of the first account to the terminal of the second account when the first answer information and the second answer information match.

In an embodiment, the processor 1002 is further configured to obtain the preset identity authentication question information; the network interface 10012 is further configured to: under control of the processor 1002, send the identity authentication question information to the terminal of the second account, receive answer information sent by the terminal of the second account, and use the answer information as the first answer information.

In an embodiment, the network interface 10012 is further configured to: under control of the processor 1002, send an identity authentication question and an answer setting request to the terminal of the second account; and receive the identity authentication question information that is sent by the terminal of the second account for the identity authentication question and the answer setting request, and the first answer information corresponding to the identity authentication question information.

In an embodiment, the processor 1002 is further configured to obtain location information of the terminal of the first account, and determine, when the location information does not match historical location information corresponding to the first account, that the first account has a risk.

In an embodiment, the processor 1002 is further configured to search the target message for a keyword matching a preset risk keyword, and determine, when the keyword is found, that the target message has a risk.

In an embodiment, the processor 1002 is further configured to determine, when the terminal of the first account does not return the second answer information corresponding to the identity authentication question information within preset duration, that the first account has a risk.

In an embodiment, the processor 1002 is further configured to: terminate forwarding the message of the terminal of the first account to the terminal of the second account when the first answer information and the second answer information do not match; and generate risk prompt information corresponding to the first account; the network interface 10012 is further configured to: under control of the processor 1002, send the risk prompt information to the terminal of the second account.

What is disclosed above is merely an example of the embodiments of this application, and certainly is not intended to limit the protection scope of this application. Therefore, equivalent variations made in accordance with the claims of this application shall fall within the scope of the embodiments of this application.

What is claimed is:

1. A message forwarding method performed at a computing device having one or more processors and memory storing a plurality of programs to be executed by the one or more processors, the method comprising:
   receiving a target message sent by a terminal of a first account to a terminal of a second account;
   searching the target message for a keyword matching a preset risk keyword;
   suspending forwarding the target message of the terminal of the first account to the terminal of the second account when the keyword matching the preset risk keyword is found in the target message and determining the first account or the target message has a risk;
   obtaining identity authentication question information and first answer information corresponding to the identity authentication question information;
   sending the identity authentication question information to the terminal of the first account and the terminal of the second account, respectively;
   receiving second answer information that is returned by the terminal of the first account and third answer information that is returned by the terminal of the second account, respectively, and that corresponds to the identity authentication question information; and
   resuming forwarding the target message of the terminal of the first account to the terminal of the second account when the first answer information, the second answer information and the third answer information match to each other.

2. The method according to claim 1, wherein the operation of obtaining identity authentication question information and first answer information corresponding to the identity authentication question information comprises:
   sending the identity authentication question information to the terminal of the second account, receiving answer information sent by the terminal of the second account, and using the answer information as the first answer information.

3. The method according to claim 1, wherein the operation of obtaining identity authentication question information and first answer information corresponding to the identity authentication question information comprises:
   sending the identity authentication question information and an answer setting request to the terminal of the second account; and
   receiving the identity authentication question information that is sent by the terminal of the second account for the identity authentication question and the answer setting request, and the first answer information corresponding to the identity authentication question information.

4. The method according to claim 1, further comprising:
   after receiving the target message sent by the terminal of the first account to the terminal of the second account, obtaining location information of the terminal of the first account, and determining, when the location information does not match historical location information corresponding to the first account, that the first account has a risk.

5. The method according to claim 1, further comprising:
after the sending the identity authentication question information to the terminal of the first account,
determining, when the terminal of the first account does not return the second answer information corresponding to the identity authentication question information within preset duration, that the first account has a risk.

6. The method according to claim 1, further comprising:
after the receiving second answer information that is returned by the terminal of the first account and that corresponds to the identity authentication question information,
terminating forwarding the message of the terminal of the first account to the terminal of the second account when the first answer information and the second answer information do not match; and
generating risk prompt information corresponding to the first account and sending the risk prompt information to the terminal of the second account.

7. A computing device for forwarding messages, comprising:
a hardware processor and memory connected to the hardware processor, the memory storing a plurality of machine readable instructions that, when executed by the hardware processor, cause the computing device to perform the following operations:
receiving a target message sent by a terminal of a first account to a terminal of a second account;
searching the target message for a keyword matching a preset risk keyword;
suspending forwarding the target message of the terminal of the first account to the terminal of the second account when the keyword matching the preset risk keyword is found in the target message and determining the first account or the target message has a risk;
obtaining identity authentication question information and first answer information corresponding to the identity authentication question information;
sending the identity authentication question information to the terminal of the first account and the terminal of the second account, respectively;
receiving second answer information that is returned by the terminal of the first account and third answer information that is returned by the terminal of the second account, respectively, and that corresponds to the identity authentication question information; and
resuming forwarding the target message of the terminal of the first account to the terminal of the second account when the first answer information, the second answer information and the third answer information match to each other.

8. The computing device according to claim 7, wherein the operation of obtaining identity authentication question information and first answer information corresponding to the identity authentication question information comprises:
sending the identity authentication question information to the terminal of the second account, receiving answer information sent by the terminal of the second account, and using the answer information as the first answer information.

9. The computing device according to claim 7, wherein the operation of obtaining identity authentication question information and first answer information corresponding to the identity authentication question information comprises:
sending the identity authentication question information and an answer setting request to the terminal of the second account; and
receiving the identity authentication question information that is sent by the terminal of the second account for the identity authentication question and the answer setting request, and the first answer information corresponding to the identity authentication question information.

10. The computing device according to claim 7, wherein the operations further comprise:
after receiving the target message sent by the terminal of the first account to the terminal of the second account, obtaining location information of the terminal of the first account, and
determining, when the location information does not match historical location information corresponding to the first account, that the first account has a risk.

11. The computing device according to claim 7, wherein the operations further comprise:
after the sending the identity authentication question information to the terminal of the first account,
determining, when the terminal of the first account does not return the second answer information corresponding to the identity authentication question information within preset duration, that the first account has a risk.

12. The computing device according to claim 7, wherein the operations further comprise:
after the receiving second answer information that is returned by the terminal of the first account and that corresponds to the identity authentication question information,
terminating forwarding the message of the terminal of the first account to the terminal of the second account when the first answer information and the second answer information do not match; and
generating risk prompt information corresponding to the first account and sending the risk prompt information to the terminal of the second account.

13. A non-transitory computer readable storage medium storing a plurality of instructions for forwarding messages in connection with a computing device having a processor, wherein the plurality of instructions, when executed by the processor, cause the computing device to perform a plurality of operations including:
receiving a target message sent by a terminal of a first account to a terminal of a second account;
searching the target message for a keyword matching a preset risk keyword;
suspending forwarding the target message of the terminal of the first account to the terminal of the second account when the keyword matching the preset risk keyword is found in the target message and determining the first account or the target message has a risk;
obtaining identity authentication question information and first answer information corresponding to the identity authentication question information;
sending the identity authentication question information to the terminal of the first account and the terminal of the second account, respectively;
receiving second answer information that is returned by the terminal of the first account and third answer information that is returned by the terminal of the second account, respectively, and that corresponds to the identity authentication question information; and resuming forwarding the target message of the terminal of the first account to the terminal of the second account when the first answer information, the second answer information and the third answer information match to each other.

14. The non-transitory computer readable storage medium according to claim 13, wherein the operation of obtaining identity authentication question information and first answer information corresponding to the identity authentication question information comprises:

sending the identity authentication question information to the terminal of the second account, receiving answer information sent by the terminal of the second account, and using the answer information as the first answer information.

15. The non-transitory computer readable storage medium according to claim 13, wherein the operation of obtaining identity authentication question information and first answer information corresponding to the identity authentication question information comprises:

sending the identity authentication question information and an answer setting request to the terminal of the second account; and receiving the identity authentication question information that is sent by the terminal of the second account for the identity authentication question and the answer setting request, and the first answer information corresponding to the identity authentication question information.

16. The non-transitory computer readable storage medium according to claim 13, wherein the operations further comprise:

after receiving the target message sent by the terminal of the first account to the terminal of the second account, obtaining location information of the terminal of the first account, and determining, when the location information does not match historical location information corresponding to the first account, that the first account has a risk.

17. The non-transitory computer readable storage medium according to claim 13, wherein the operations further comprise:

after the sending the identity authentication question information to the terminal of the first account, determining, when the terminal of the first account does not return the second answer information corresponding to the identity authentication question information within preset duration, that the first account has a risk.

* * * * *